Patented June 29, 1926.

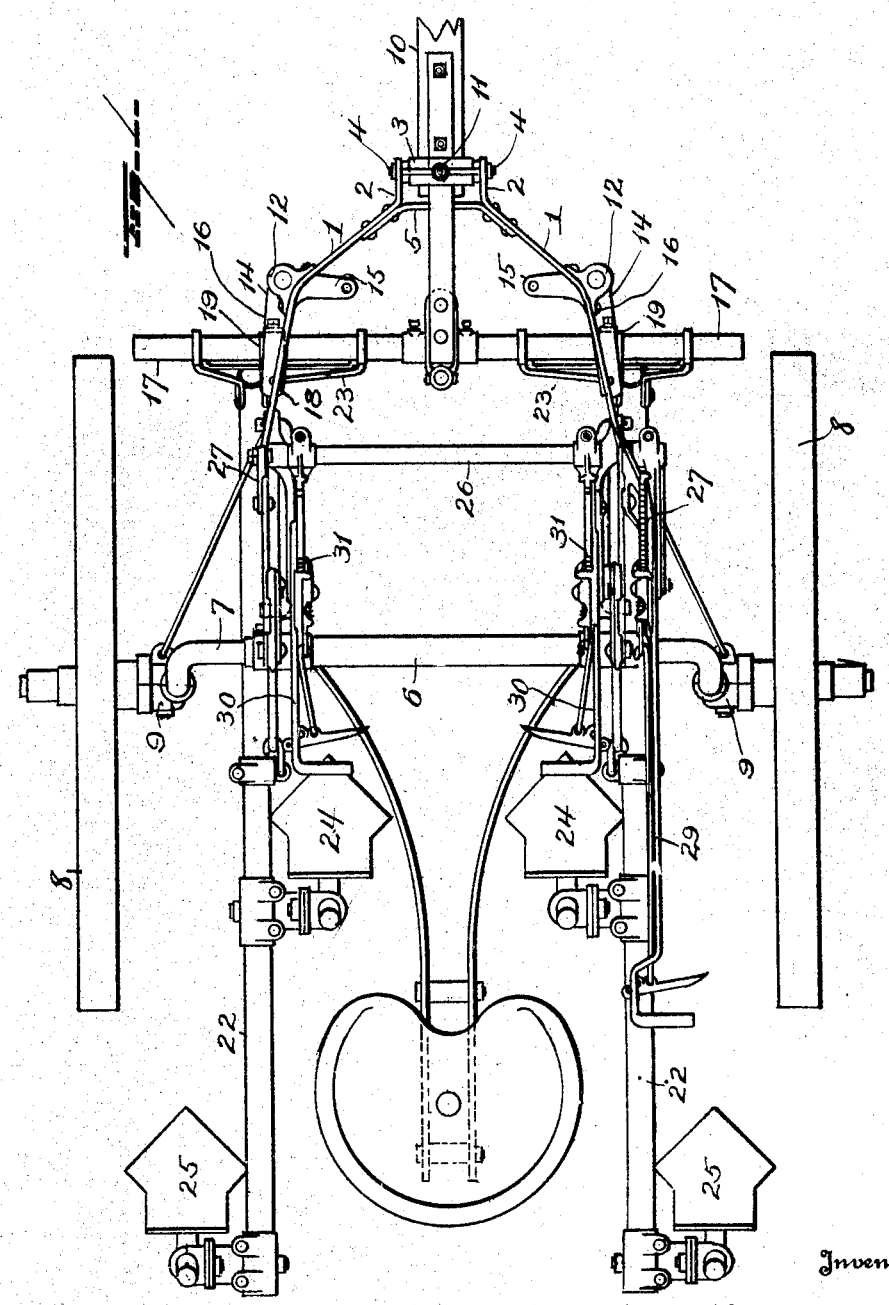

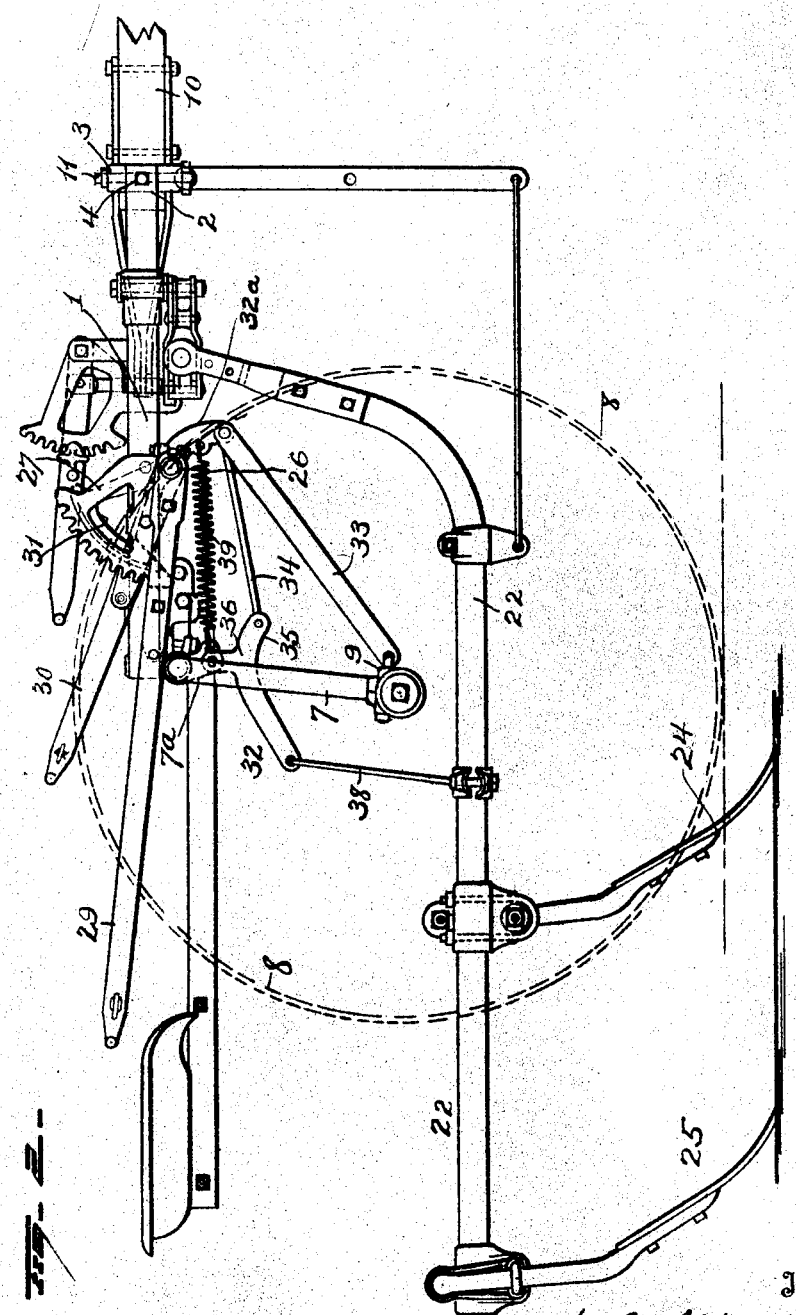

1,590,665

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

WHEELED CULTIVATOR.

Original application filed March 25, 1925, Serial No. 18,240. Divided and this application filed August 26, 1925. Serial No. 52,659.

This invention relates to improvements in wheeled cultivators, this application being a division of application for patent filed by me on the 25th day of March, 1925, and designated by Serial No. 18,240.

The object of my present invention is to provide simple and effective means for lifting the cultivator gangs.

With this and other objects in view, the invention consists in certain novel features of construction and combinations of parts as hereinafter set forth and pointed out in the claims.

In the accompanying drawings;

Figure 1 is a plan view of a cultivator showing an embodiment of my invention, and Figure 2 is a view in side elevation.

The frame of the cultivator is indicated at 1 and the forward portions of said frame are made convergent and formed with short parallel arms 2, between which a hollow casting 3 is supported on horizontal bolts 4. The forward portions of the frame bars are connected, in rear of the arms 2, by a brace 5. The rear cross bar 6 of the frame may be made tubular and provides a mounting for a crank axle 7 for the accommodation of carrying wheels 8,—sand bands 9 being secured to the cranks of the axle adjacent to the wheel hubs.

The rear end of a pole 10 enters the hollow casting 3 at the forward end of the frame 1 and is pivotally connected thereto by a vertical pivot bolt 11.

Secured to the forward portion of the frame 1, at respective sides of the same, are brackets 12 which provide bearings for the pivot pins 13 of bell-crank levers 14, the arm 15 of each of which is shorter than the arm 16 thereof, and the latter are connected with a transverse bar 17 through the medium of blocks 18.

The arms 15 of said bell-crank levers are connected through the medium rods with foot levers as and for the purpose explained by my application hereinbefore identified.

Cultivator beams 22 are connected with the transverse bar 17 through the medium of brackets 23 so that said beams may be raised and lowered and each beam 22 carries forward and rear shovels 24, 25.

A transverse shaft 26 is mounted in a bearing bracket 27 at one side of the frame 1 and in a bearing afforded by a segment bracket 28 secured to the other side of the frame, and to this shaft, a hand lever 29 is secured,—said hand lever being provided with a suitable detent to engage the teeth of said segment. Smaller hand levers 30 are loosely mounted on the shaft 26 at respective sides of the frame and carry suitable detents to engage toothed segments 31. The short levers 30 are provided with depending arms 32ª and these are connected, by bars 33 with the sand bands 9, and therefore with the cranks of the axle. Rods 34 are also connected with the lever arms 32ª coincident with the pivotal connection thereto of the bars 33 and the rear ends of these arms are connected with the short arms 35 of bell-crank-levers 36 pivotally supported under the frame. In the drawings the bell-cranks 36 are shown as connected with the axle brackets 7ª. The longer rear arms 32 of the bell-crank-levers 36 are connected by rods 38 with the cultivator beams 22, and a lifting spring 39 is connected at one end to the short arm 32ª of each lever 30 and at their rear ends these springs are connected with the frame, through the medium of the axle brackets 7ª.

With the construction and arrangement of lifting mechanism above described, both cultivator gangs may be raised and the wheels moved backwardly by raising the main lever 29, and the lowering of said lever will effect the lowering of the two gangs and the forward movement of the wheels. By manipulation of either of the auxiliary levers 30, one of the gangs may be raised or lowered independently of the other and one of the wheels moved backwardly or forwardly. It will also be seen that when the main lever 29 is operated both springs 39 will be brought into action but that when one of the levers 30 is manipulated, only one of the springs will be brought into action.

Various changes might be made in the details of construction of my invention without departing from the spirit of the latter or limiting its scope and hence I do not wish to restrict myself to the precise details herein set forth.

Having fully described my invention what I claim as new and desire to secure by Letters-Patent, is:—

1. In a cultivator, the combination with a frame, a crank axle, and wheels, a transverse bar carried thereby, a plurality of cultivator gang beams connected with said bar, of a transverse shaft mounted on the frame, a segment secured to the frame, a main hand lever secured to said transverse shaft and carrying a detent for cooperation with said segment, a plurality of segments secured to said shaft, auxiliary levers loose on said shaft and carrying detents for cooperation with said last-mentioned segments, each of said auxiliary levers having a depending arm, bell-crank-levers supported by the frame, a connection between one arm of each bell-crank-lever and the depending arm of an auxiliary lever, and connections between the other arms of said bell-crank-levers and the respective cultivator gang beams.

2. In a cultivator, the combination with a frame, a crank axle, and wheels, a transverse bar carried thereby and a plurality of cultivator gang beams connected with said bar, of a transverse shaft mounted on the frame, a segment secured to the frame, a main hand lever secured to said transverse shaft and carrying a detent for cooperation with said segment, a plurality of segments secured to said shaft, auxiliary levers loose on said shaft and carrying detents for cooperation with said last-mentioned segments, each of said auxiliary levers having a depending arm, bell-crank-levers supported by the frame, a connection between one arm of each bell-crank-lever and the depending arm of an auxiliary lever, connections between the other arms of said bell-crank-levers and the respective cultivator gang beams, and connections between the depending arms of the auxiliary levers and the cranks of the axle of the cultivator.

3. In a cultivator, the combination with a frame, a crank axle, and wheels, a transverse bar carried thereby and a plurality of cultivator gang beams connected with said bar, of a transverse shaft mounted on the frame, a segment secured to the frame, a main hand lever secured to said transverse shaft and carrying a detent for cooperation with said segment, a plurality of segments secured to said shaft, auxiliary levers loose on said shaft and carrying detents for cooperation with said last-mentioned segments, each of said auxiliary levers having a depending arm, bell-crank-levers supported by the frame, a connection between one arm of each bell-crank-lever and the depending arm of an auxiliary lever, connections between the other arms of said bell-crank-levers and the respective cultivator gang beams, and lifting springs between the depending arms of the auxiliary levers and the frame.

In testimony whereof, I have signed this specification.

HERMAN E. ALTGELT.